(12) United States Patent
Tuttle et al.

(10) Patent No.: US 6,234,508 B1
(45) Date of Patent: May 22, 2001

(54) UPPER LINK SENSING

(75) Inventors: Thomas B. Tuttle, Naperville; William L. Schubert, Downers Grove; Michael Stelzle, Aurora, all of IL (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/390,561

(22) Filed: Sep. 3, 1999

(51) Int. Cl.$^7$ .................................................. B60D 3/00
(52) U.S. Cl. .................................. 280/406.1; 280/446.1
(58) Field of Search .......................... 280/406.1, 405.1, 280/446.1, 447, 449; 172/7–12, 439, 443

(56) References Cited

U.S. PATENT DOCUMENTS

| | | | |
|---|---|---|---|
| 3,215,404 | * | 11/1965 | Ryan ...................................... 254/327 |
| 3,995,696 | * | 12/1976 | Kainer et al. ............................ 172/7 |
| 4,271,910 | * | 6/1981 | Schafer .................................... 172/2 |
| 4,640,368 | * | 2/1987 | Kittle et al. ............................ 172/430 |
| 4,909,331 | * | 3/1990 | Defranco ................................... 172/4 |
| 4,931,967 | * | 6/1990 | Boe et al. ................................. 172/7 |
| 5,549,166 | * | 8/1996 | Orbach et al. ............................ 172/4 |
| 5,584,347 | | 12/1996 | Bennett . |
| 6,041,582 | * | 3/2000 | Tiede ..................................... 56/10.2 |
| 6,076,612 | * | 6/2000 | Carr et al. ................................ 172/7 |
| 6,089,328 | * | 7/2000 | Moore et al. .......................... 172/447 |
| 6,105,679 | * | 8/2000 | Schubert et al. ........................... 172/4 |

FOREIGN PATENT DOCUMENTS

3446811C2   7/1986   (DE) .

* cited by examiner

Primary Examiner—Robert P. Olszewski
Assistant Examiner—Michael Cuff
(74) Attorney, Agent, or Firm—Foley & Lardner

(57) ABSTRACT

A load sensor is provided on a tractor to sense a load in the upper link of a three point hitch. The load sensor is fixed to the upper link, rather than the tractor to move with the upper link rather than the tractor. This arrangement permits the load sensor to always indicate the longitudinal load placed on the upper link.

20 Claims, 3 Drawing Sheets

UPPER LINK SENSING

FIELD OF THE INVENTION

The invention relates generally to load sensing in work vehicles. More particularly, it relates to load sensors located between a work vehicle and a towed implement.

BACKGROUND OF THE INVENTION

Work vehicles such as tractors and backhoes, for example, tow implements using a variety of hitches to connect the vehicle and the implement. One of the most common hitches is called a "three point hitch." It is called a three point hitch since it has three substantially parallel links or connections that extend between the vehicle (usually a tractor) and the implement. These links permit the motion between the vehicle and the implement to be constrained to relative translation, and substantially prevent relative rotation.

Many tractors or other work vehicles are able to electronically monitor and control their travel through the field, as well as control the height of and load placed upon the implement. This control is especially useful to regulate the speed of the tractor, the power output of the engine, the tractor's gear ratio and the height of the implement above or below the ground. Using various sensors on the vehicle, the tractor can raise the implement to reduce the implement load, increase the power output of the engine, down shift to a lower gear or reduce the speed of the tractor.

To sense the load placed on the tractor by the implement, a load sensor is typically provided between the implement and the tractor to sense the load placed on one or more of the links connecting the tractor to the implement. These sensors can be arranged to provide two different types of sensings: indirect and direct load sensing. Both of these methods have serious limitations. The direct method places a load sensor between the tractor and the implement that directly senses the strain applied by the implement on the tractor. As an example, a load pin is placed between one or more of the three links and the tractor or between one or more of the three links and the implement. A common direct sensing method has been to replace one or more of the pins coupling the three links of the three point hitch to the tractor or one or more of the three links connecting the three point hitch to the implement with a load sensing pin that provides an electronic signal indicative of the load applied to the pin. As the links are pulled by the tractor towing the implement, they in turn apply a force to the load pin. Load cells placed on the load pin provide an electrical signal indicative of the load on the load pin.

There are problems with the direct method. In the direct method, the pin is fixed with respect to the tractor. A bracket fixed to the tractor commonly has two ears or webs with holes through which the load pin extends. The bracket defines the axis of the load pin perpendicular to the direction of travel of the tractor, extending either vertically or horizontally, and prevents the pin from moving. Since the load sensed by the load pin typically indicates a load applied perpendicular to the load pin axis, it is responsive only to loads applied straight backward away from or forward toward the tractor. As the implement moves from side to side, however, it places a bending or torsional load on the load pin. This causes the load pin to give a false reading of the load in the link.

In the indirect method a spring member is located between the upper link and the tractor. As a load is applied to the upper link, the spring member deflects. This deflection is either sensed by a position sensor or a load sensor. While this eliminates some of the problems of the direct method, it is less accurate than the direct method.

What is needed, therefore, is an improved method and apparatus for sensing the load applied by an implement to a tractor. It is an object of this invention to provide such a method and apparatus.

SUMMARY OF THE PRESENT INVENTION

In accordance with the first embodiment of the invention an agricultural vehicle is disclosed including a tractor, an implement and a multi-point hitch connecting the tractor to the implement, the hitch including a plurality of links extending from the tractor to the implement, a swivel disposed between and coupling at least one of the links to the tractor, and a load sensor disposed between the swivel and the at least one link. The load sensor may be fixed with respect to the at least one link. The load sensor may have a primary sensing direction and that sensing direction may be fixed with respect to the at least one link. Load sensor may be a cylindrical load pin having a longitudinal cylindrical axis. The swivel may be constrained to pivot with respect to the tractor about a first pivotal axis. The at least one link may be constrained to pivot about the swivel about a second pivotal axis substantially orthogonal to the first pivotal axis. The first pivotal axis may be substantially horizontal.

In accordance with a second embodiment of the invention, a multi-point hitch for connecting a tractor to an implement is disclosed including an upper link extending from the tractor from an upper point on the tractor and couplable to an implement, two links extending from the tractor at two laterally spaced points below the upper point and couplable to an implement, a swivel coupled between the tractor and the upper link, and a load sensor coupled between the swivel and the upper link. The load sensor may have a primary sensing direction and this direction may be fixed with respect to the upper link when the upper link pivots with respect to the tractor. The load sensor may be disposed between the swivel and the upper link to transmit substantially the entire load in the upper link to the tractor. The swivel may be constrained to pivot with respect to the tractor about a first pivotal axis. The upper link may be constrained to pivot about the swivel about a second pivotal axis substantially orthogonal to the first pivotal axis. The first pivotal axis may be substantially horizontal.

In accordance with a third embodiment of the invention, an agricultural vehicle is disclosed including a tractor, and an elongate load sensing member having first and second ends and a longitudinal axis and coupled to the tractor at the first end, the member including, a first coupler disposed at the first end, a second coupler disposed at the second end and a load sensor fixed to the first coupler. The vehicle may further include a threaded cylinder disposed between and coupling the first coupler to the second coupler. The member may pivot with respect to the tractor at least about a horizontal and a vertical axis. The load sensor may pivot together with the member about the horizontal and vertical axes. The threaded cylinder may be rotatable with respect to the first and second ends to shorten or lengthen the elongate member. The first coupler may include an eye. The first coupler may also include a clevis.

Other principal features and advantages of the invention will become apparent to those skilled in the art upon review of the following drawings, the detailed description and the appended claims.

Figure 1:
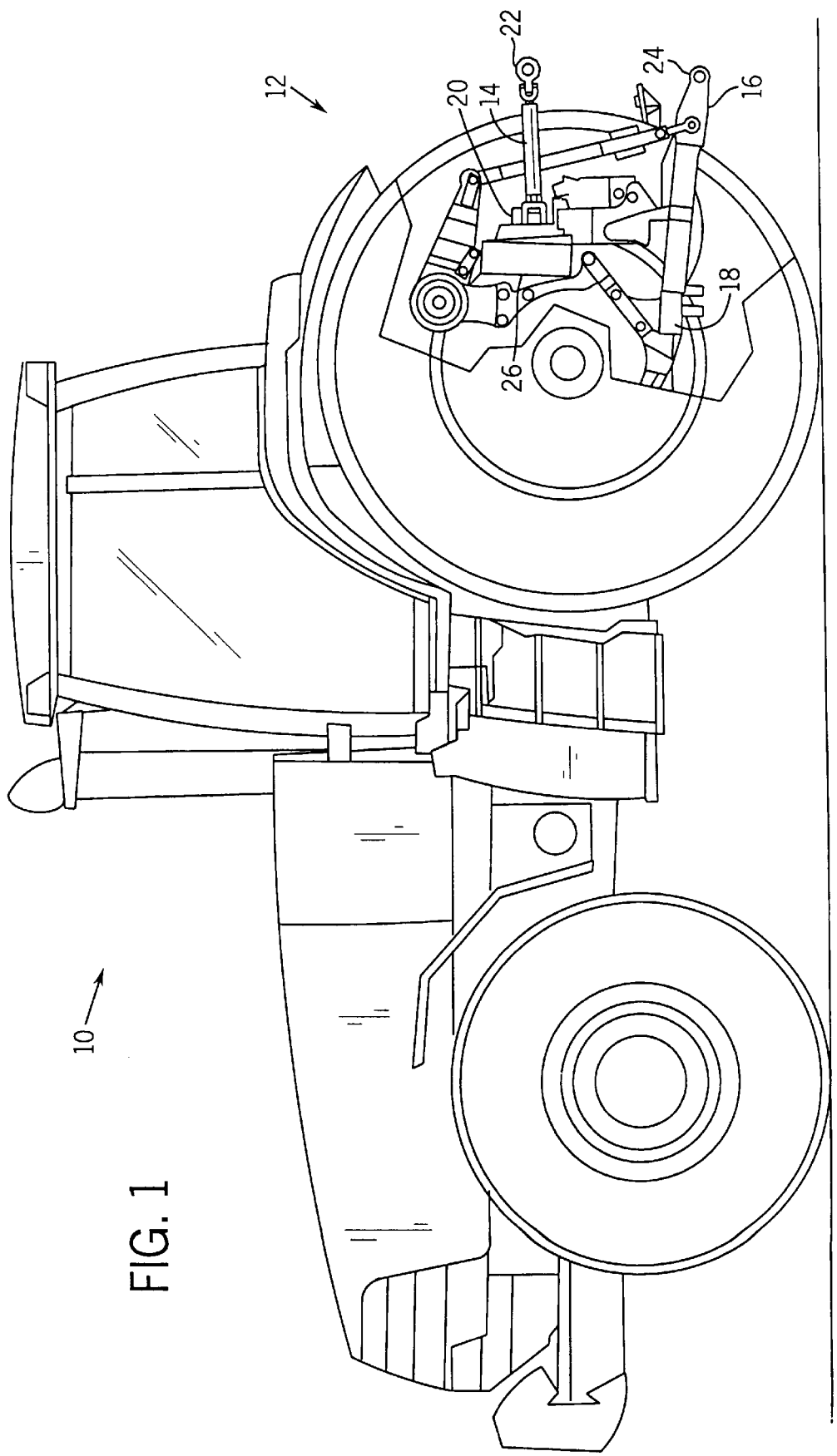
FIG. 1 shows a tractor having a three point hitch, including an upper link, and two lower links as well as a load pin disposed between the upper link and the tractor.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

FIG. 1 illustrates a tractor 10 having a three point hitch 12 to which implements can be coupled. Three point hitch 12 includes an upper link 14 and a pair of lower links 16 (only one shown) disposed below upper link 14 to which the implement is coupled. These links are pivotally coupled to the tractor at lower link pivot point 18 and upper link pivot point 20. The pivotal couplings disposed between the lower link and the upper link at these pivot points permit the upper and lower links to pivot birth up and down and from side to side about the pivot points with respect to the tractor. Upper link 14 includes a coupler 22, shown in FIG. 1 as a swivel, for coupling upper link 14 to the implement at an upper coupling point (not shown) on the implement. Lower links 16, include a lower link coupler 24, here shown as an eye in the ends of lower links 16 which are connected to two lower coupling points on the implement. Alternatively, lower link coupler may be a hook.

Hitch 12 also includes a pair of actuators 26, here shown as hydraulic cylinders, that raise and lower the hitch with respect to the tractor. When the actuators are extended, they raise the lower link couplers 24 with respect to the tractor, causing the implement to raise with respect to the tractor. Since upper link coupler 22 is also pivotally coupled to the implement, it is similarly lifted by the implement as the implement is raised by lower link 16. Upper link 14 and lower links 16 pivot about upper link pivot point 20 and lower pivot point 18 to cause the implement to substantially translate with respect to the tractor, and not to rotate significantly with respect to the tractor.

Figure 2:
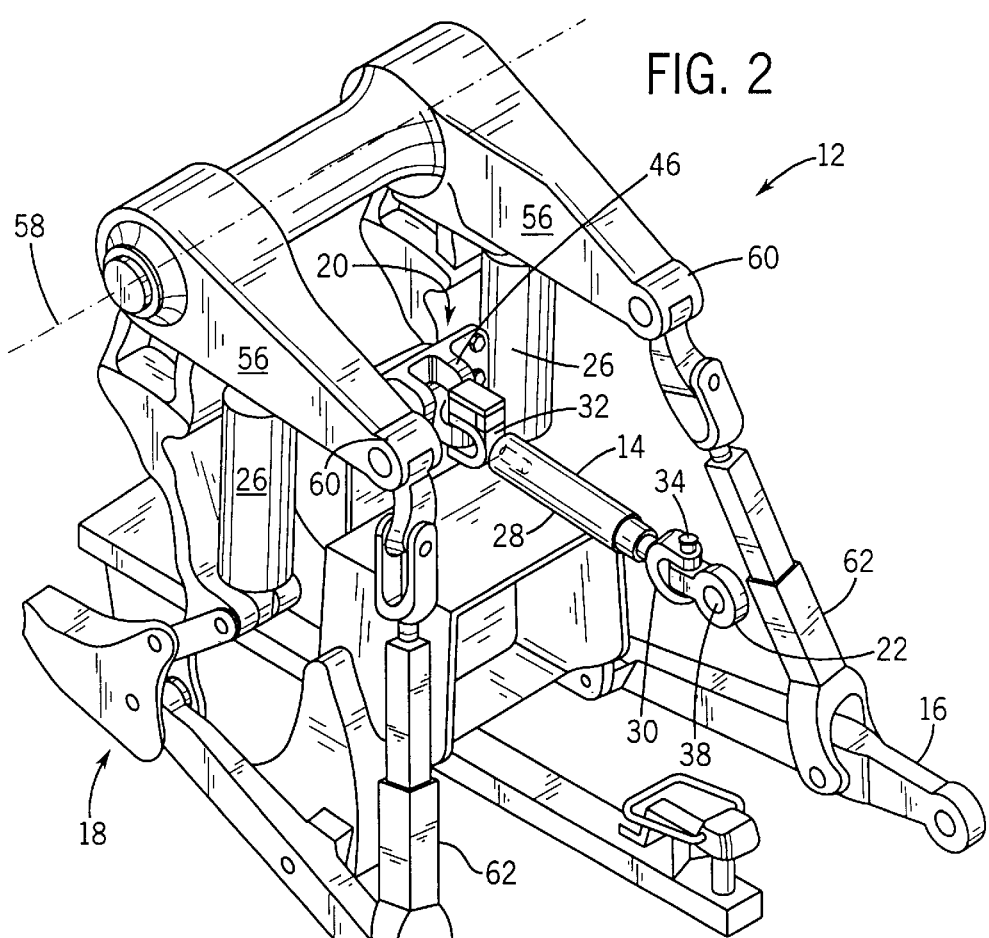
FIG. 2 is a perspective view of the hitch of FIG. 1 with the tractor removed showing the arrangement of upper and lower links, the actuators and the lifting links.

FIG. 2 shows a detailed view of multi-point hitch 12 with tractor 10 removed. Upper link 14 is in the form of a turnbuckle having an internally threaded cylinder 28 into which two devises 30, 32 are threaded. Clevis 30 is disposed at the outer end of the upper link 14. The two ears or webs of clevis 30 define a vertical passage for receiving pin 34. Clevis 30 receives a swivel 22 to which it is pivotally ceupled. Clevis 30 and swivel 22 are constrained to rotate with respect to each other about the vertical axis defined by pin 34. Swivel 22 includes at an end distal from the tractor a second pin receiving passage 38 that is adapted to be coupled to the upper connection point of the three point connection on the implement. Passage 38 is preferably substantially orthogonal to pin 34, and thus is horizontally disposed.

By coupling the implement about a horizontal pivotal axis of swivel 22 defined by pin receiving passage 38 and coupling upper link 14 to swivel 22 about a vertical pivotal axis defined by pin 34, upper link 14 can pivot with respect to the implement with two degrees of freedom. It is to be recognized that the same two degrees of freedom could be provided by reversing the pivotal axes. Similarly, an eye could be provided instead of clevis 30 and swivel 22 could have a mating clevis to engage that eye. Several different arrangements are possible that permit two degrees of rotational freedom of upper link 14 with respect to the implement.

Clevis 32 is similarly coupled to the tractor. The two ears or webs of clevis 32 have holes 39 (FIG. 4) that define a vertical pin receiving passage 40. Passage 40 receives pin 42 which passes through hole 43 in swivel 44. The pin, pin receiving passage and swivel are configured to permit swivel 44 to rotate about a vertical axis with respect to upper link 14. The other end of swivel 44 has a hole 45 that defines a horizontal pin receiving passage. This is disposed between two ears of mounting bracket 66 which is coupled to and extends from the tractor and define a clevis 46. Each ear of clevis 46 has a hole 47 that, together with hole 45 of swivel 44, defines a horizontal pin receiving passage into which pin 48 is inserted, which constrains swivel 44 to rotate with respect to the tractor about a horizontal axis defined by pin 48.

As can be appreciated from the above description, both ends of upper link 14 are similarly configured to provide two degrees of rotational freedom to upper link 14 both with respect to the tractor and with respect to the implement.

While the pivotal axes at each end of upper link 14 are preferably orthogonal they may nonetheless be somewhat less than orthogonal and still provide relatively free pivoting with two degrees of freedom without binding. The degree to which they vary from the preferred orthogonal relationship will depend primarily on the materials, lubricants and tolerances of the parts involved. Too great a reduction in orthogonality will cause enhanced wear of the pins and premature failure.

In addition, the axes, while preferably shown as vertical and horizontal, need not be so arranged. It is primarily for convenience in manufacturing that horizontal and vertical axes are preferred, since this arrangement provides for more balanced loads on the components. While upper link 14 is shown as terminating in clevises, it need not do so. It could terminate in an eye, and swivels 22 and 44 have devises instead of eyes at each end.

To adjust the length of upper link 14, cylinder 28 can be grasped and rotated to reduce or increase the overall length of upper link 14. This is possible since the internal threads in cylinder 28 have opposite hands at opposing ends. One clevis is threaded into cylinder 28 with a left hand thread and the other clevis is threaded into cylinder 28 with a right hand thread. Rotation of cylinder 28, therefore, results in retraction of both devises toward cylinder 28 or extension of both devises away from cylinder 28.

Hitch 12 is lifted when actuators 26 fill with hydraulic fluid under pressure. The rod ends of actuators 26 are pivotally coupled to arms 56. Arms 56 are also coupled to tractor 10 and pivot about rotational axis 58 when actuators 26 extend or retract. The hitch is raised when actuators 26 extend. Arms 56 rotate counterclockwise (FIG. 2) around axis 58 causing ends 60 of arms 56 to raise with respect to the tractor. Ends 60 of arms 56 are pivotally coupled to lifting links 62 which, in turn, are pivotally coupled to lower links 16. Thus, when ends 60 raise, the free ends of lower links 16 raise with respect to the tractor as the other ends of lower links 16 pivot about pivot points 18. When connected to an implement, this causes the implement to lift with respect to the tractor as well. Since upper link 14 is also pivotally coupled to the tractor, the outer end of upper link 14 coupled to the implement also rises pivoting with respect to the implement about a horizontally disposed pin inserted in passageway 38 in swivel 22. The inner end of upper link 14, however, is rotationally coupled to the tractor and cannot rise. Thus, the inner end of upper link 14 pivots about the tractor around the horizontal axis defined by pin 48.

Figure 3:
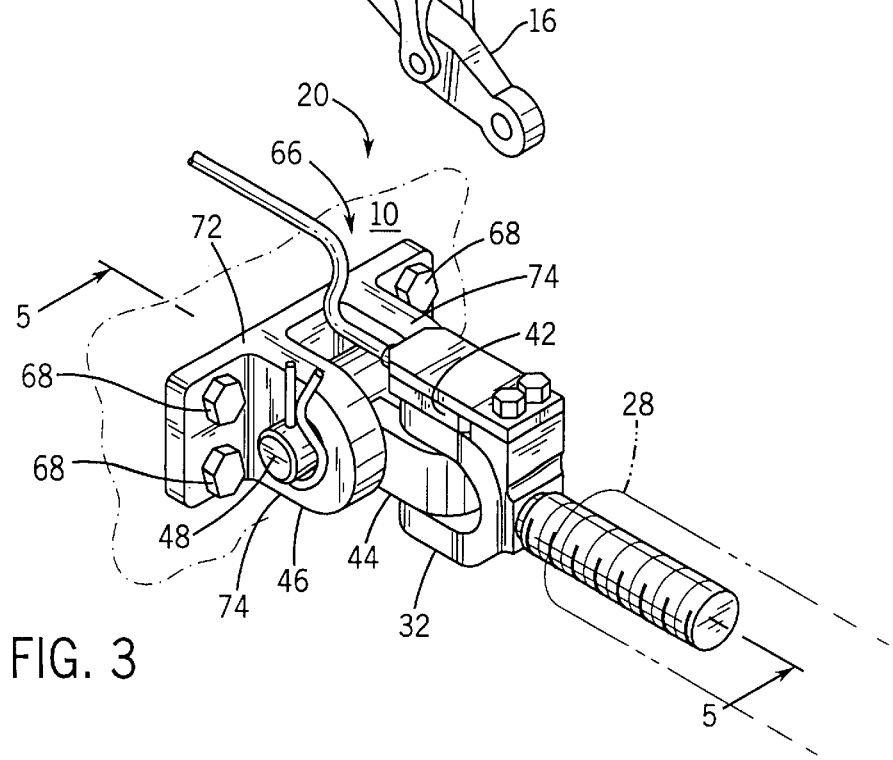
FIGS. 3 and 4, respectively, are assembled and exploded perspective views of the upper link mounting bracket and a portion of the upper link of the hitch shown in FIG. 2.
Figure 4:
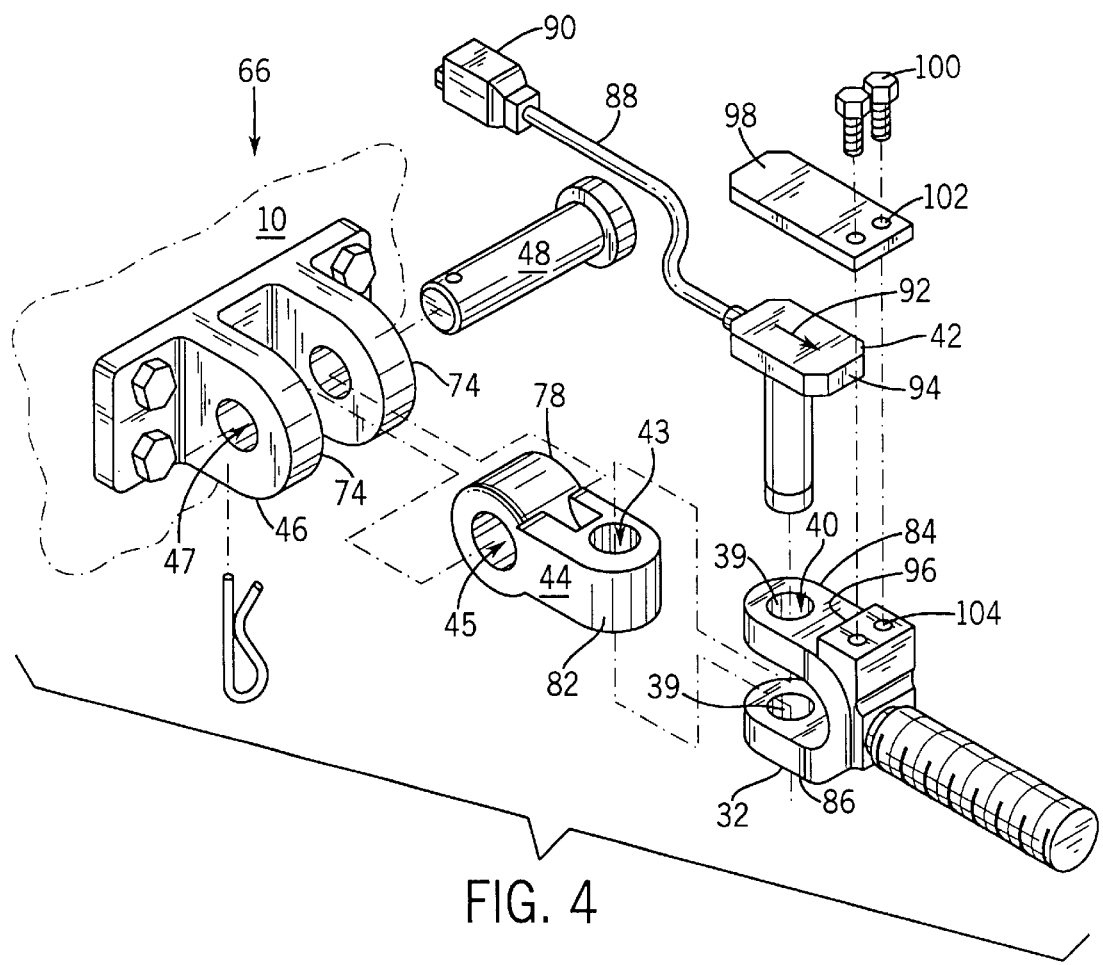

FIGS. 3 and 4 show an assembled and exploded view, respectively, of the tractor-end of upper link 14 and the structures that couple it to the tractor. Upper link 14 is coupled to mounting bracket 66 which is removably fastened to the tractor by removable fasteners here shown as bolts 68. These fasteners extend through holes in mounting bracket 66 and screw into the gear case of the tractor. Mounting bracket 66 includes a base plate 72 through which the holes pass and two outwardly extending webs or ears 74 disposed in parallel in spaced apart relation. A bore or hole 47 passes through both ears 74 to define clevis 46 and a substantially horizontal pivotal axis for swivel 44. Eye 78 of swivel 44 has a horizontal bore or hole 45. Eye 78 is inserted between ears 74. Hole 45 together with holes 47 define a horizontal passageway for receiving pin 48. In this manner, swivel 44 is constrained to rotate about a substantially horizontal axis with respect to mounting bracket 66. Alternatively, the mounting bracket can be disposed of and webs or ears 74 can be formed integral with and extend directly from the tractor transmission housing.

The inner facing surfaces of ears 74 are spaced apart to provide only a small gap between eye 78 and ears 74. This minimizes the twisting of eye 78 and concomitant wear of pin 48. The end of swivel 44 that is disposed away from the tractor and mounting bracket has a second eye 82 that has a hole or bore 43 substantially perpendicular to hole 45 at the other end of swivel 44. In the preferred embodiment, when swivel 44 is extended horizontally, hole 43 extends vertically.

Eye 82 of swivel 44 is inserted between ears or webs 84 and 86 of clevis 32. The inner facing surfaces of ears 84 and 86 are spaced apart to provide only a small gap between eye 82 and ears 84 and 86. This minimizes the twisting of eye 82 and concomitant wear of pin 42. The inner facing surfaces of ears 84 and 86 are preferably parallel and perpendicular to the axis of pin 42.

Pin 42 is a load sensor. It is inserted through holes 39 and 43 in clevis 32 and swivel 44, respectively. It carries the entire load transmitted from upper link 14 to tractor 10. Load cells (not shown) mounted inside pin 42 sense the load applied to the pin and transmit a signal indicative of this load through cable 88 to connector 90. Connector 90, in turn, is coupled to an electronic controller on the tractor (not shown) which uses this signal to control hitch motion. Pin 42 has a primary sensing direction indicated by arrow 92 on the top of the pin. This direction indicates the direction of greatest sensor sensitivity. When loads are applied to the pin in the direction of the arrow, the primary sensing direction, the signal provided at connector 90 will be at its greatest. Since pin 42 is fixed with respect to clevis 32, and hence upper link 14, its primary sensing direction cannot change position with respect to the upper link. As a result, the signal provided by pin 42 is always indicative of the longitudinal load applied to upper link 14, regardless of the orientation of upper link 14. This is achieved by constraining pin 42 so it cannot rotate within pin receiving passageway 40 and therefore always rotates with upper link 14. Mating alignment surface 94, here shown as a flat surface on pin 42, is configured to abut a similar mating aligning surface 96 on clevis 32. These surfaces are disposed such that pin 42 cannot rotate when it is inserted into pin receiving passage 40. To prevent pin 42 from falling out of passage 40, a pin retainer, here shown as plate 98, is fastened over the top of pin 42 once it is inserted into passage 40. Plate 98 is fixed to clevis 32 by bolts 100 which pass through holes 102 in plate 98 and screw into holes 104 on clevis 32.

Figure 5:
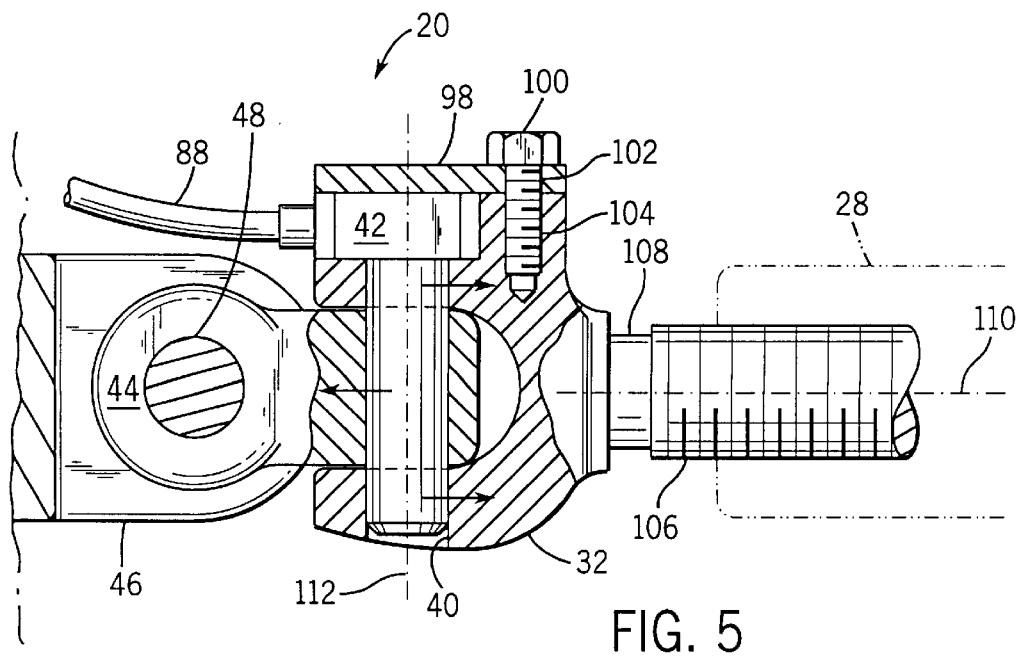
FIG. 5 is a partial cross-sectional side view of the upper link mounting bracket and upper link of FIGS. 3 and 4.

Referring now to FIG. 5, the arrangement of clevis 32 with respect to threaded cylinder 28 can be seen. Threads 106 are provided on an outer surface of shaft 108 extending from clevis 32. The longitudinal axis 110 of shaft 108 is preferably coaxial with the longitudinal axis of cylinder 28 and upper link 14, and is preferably perpendicular to longitudinal axis 112 of pin 42. In this manner, only a limited if any twisting moment is applied to pin 42 by swivel 44.

Thus, it should be apparent that there has been provided in accordance with the present invention an improved upper link sensing that fully satisfies the objectives and advantages set forth above. Although the invention has been described in conjunction with specific embodiments thereof, it is evident that many alternatives, modifications and variations will be apparent to those skilled in the art. In particular, the swivel may be a different forms such as those commonly used in agricultural or work vehicles for coupling lnks to implements or towing vehicles. In addition, the load pin may be disposed between the link and the vehicle, or between the link and the implement. Accordingly, it is intended to embrace all such alternatives, modifications and variations that fall within the spirit and broad scope of the appended claims.

What is claimed is:

1. A work vehicle, comprising:
    a towing vehicle;
    a multi-point hitch configured to connect the towing vehicle to an implement, the hitch including,
        a plurality of links extending from the towing vehicle,
        a swivel coupled to at least one of the links, and
        a load sensor disposed between the swivel and the at least one link.

2. The vehicle of claim 1, wherein the load sensor is fixed with respect to the at least one link.

3. The vehicle of claim 2, wherein the load sensor has a primary sensing direction, and wherein the primary sensing direction is fixed with respect to the at least one link.

4. The vehicle of claim 3, wherein the load sensor is a cylindrical load pin having a longitudinal cylindrical axis.

5. The vehicle of claim 4, wherein the swivel is constrained to pivot with respect to the towing vehicle about a first pivotal axis.

6. The vehicle of claim 5, wherein the at least one link is constrained to pivot about the swivel about a second pivotal axis substantially orthogonal to the first pivotal axis.

7. The vehicle of claim 6, wherein the first pivotal axis is substantially horizontal.

8. The work vehicle of claim 1 wherein the load sensor is configured to transmit substantially the entire longitudinal load placed on the at least one link by the implement.

9. A multi-point hitch for connecting a vehicle to an implement, comprising:
    an upper link extending from the vehicle from an upper point on the vehicle and couplable to an implement;
    two lower links extending from the vehicle at two laterally spaced points below the upper point and couplable to an implement;

a swivel coupled between the vehicle and the upper link; and a load sensor coupled between the swivel and the upper link.

10. The hitch of claim 9, wherein the load sensor has a primary sensing direction, and wherein the primary sensing direction is fixed with respect to the upper link when the upper link pivots with respect to the vehicle.

11. The hitch of claim 10, wherein the load sensor is disposed between the swivel and the upper link to transmit substantially the entire load in the upper link to the vehicle.

12. The hitch of claim 11, wherein the swivel is constrained to pivot with respect to the vehicle about a first pivotal axis.

13. The hitch of claim 12, wherein the upper link is constrained to pivot about the swivel about a second pivotal axis substantially orthogonal to the first pivotal axis.

14. The hitch of claim 13, wherein the first pivotal axis is substantially horizontal.

15. An agricultural vehicle comprising:

a tractor; and an elongate load sensing member having first and second ends and a longitudinal axis and coupled to the tractor at the first end, the member including,
a swivel disposed at the first end,
a second coupler disposed at the second end, and
a load sensor disposed between the swivel and the load sensing member.

16. The vehicle of claim 15, further comprising a threaded cylinder disposed between and coupling the swivel to the second coupler.

17. The vehicle of claim 16, wherein the member pivots with respect to the tractor at least about a horizontal axis and a vertical axis.

18. The vehicle of claim 17, wherein the load sensor pivots together with the member about the horizontal and vertical axes.

19. The vehicle of claim 18, wherein the threaded cylinder is rotatable with respect to the first and second ends to shorten or lengthen the elongate member.

20. The vehicle of claim 19, wherein the swivel includes an eye.

* * * * *